Figure 1:
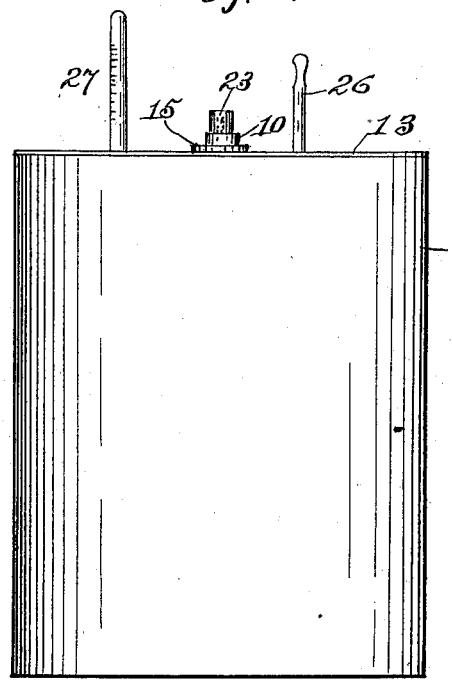

No. 673,325. Patented Apr. 30, 1901.
S. W. PARR.
APPARATUS FOR DETERMINING HEATING CAPACITY OF COMBUSTIBLES.
(Application filed June 14, 1900.)
(No Model.) 2 Sheets—Sheet 1.

Witnesses

Inventor
Samuel W. Parr
By C. F. Belt
Attorney

No. 673,325. Patented Apr. 30, 1901.
S. W. PARR.
APPARATUS FOR DETERMINING HEATING CAPACITY OF COMBUSTIBLES.
(Application filed June 14, 1900.)
(No Model.) 2 Sheets—Sheet 2.
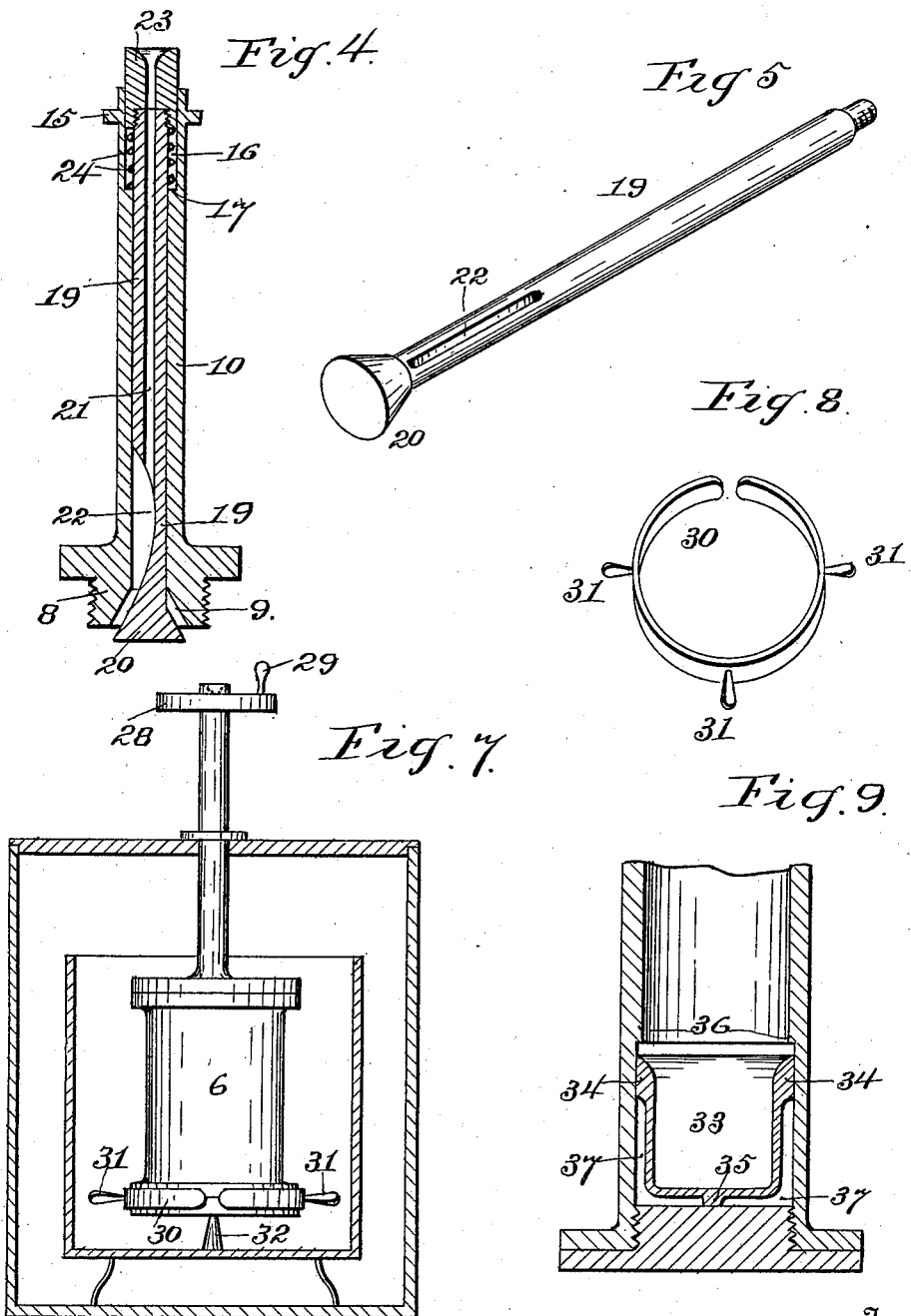

UNITED STATES PATENT OFFICE.

SAMUEL W. PARR, OF URBANA, ILLINOIS.

APPARATUS FOR DETERMINING HEATING CAPACITY OF COMBUSTIBLES.

SPECIFICATION forming part of Letters Patent No. 673,325, dated April 30, 1901.

Application filed June 14, 1900. Serial No. 20,328. (No model.)

*To all whom it may concern:*

Be it known that I, SAMUEL W. PARR, a citizen of the United States, residing at Urbana, in the county of Champaign and State of Illinois, have invented certain new and useful Improvements in Apparatus for Determining the Heating Capacity of Combustibles, of which the following is a specification.

This invention relates to calorimeters, and particularly to the class of such devices employing a cartridge in which combustion takes place to heat a surrounding body of water, the temperature of which is taken to determine the heating capacity of combustibles.

The object of the invention is to provide an apparatus whereby coal, coke, oils, and other combustibles are burned in such a manner as to retain in one fused mass the products of combustion, from which mass the heat units generated are absorbed by a surrounding body of water, which is thereby made to register the calorific power of the combustibles.

In all other means and apparatus known to me the chemical or chemical mixture supplying the necessary oxygen for combustion is not made to absorb the products of combustion. Hence the gaseous material resulting therefrom must be conducted through conduits for absorbing the heat and freeing the gases. The chemical reactions involved in such mixtures involve also the absorption or evolution of heat units other than those involved in the combustion, and the same heat units also vary with the quantity of heat, the quantity of combustible, and the quantity of chemical employed, thus making the final result altogether indeterminate and unreliable. According to my invention the above and other resultant objections and disadvantages are overcome, as the chemical supplies the necessary oxygen for combustion, and the products of combustion are not discharged, but absorbed by said chemical. The combustible material is mixed with a chemical—as, for example, sodium peroxid ($Na_2O_2$) or other chemical compound—which will supply the necessary oxygen for supporting and completing the combustion and which will at the same time absorb or unite with the products of combustion, thus retaining the gases and centering in one fused mass all the heat units generated. From this fused material the heat units are absorbed through the walls of the combustion-chamber or cartridge, the water thereby being made to register the heating capacity of the combustibles, so that there is no possibility of losing any of the heat units, as they have to pass into and through the surrounding water.

By accurately measuring the amount of combustible and water and the rise in temperature the factors are obtained whereby the calculation is easily made to the standard units for expressing heat equivalents—viz., the calory or British thermal unit.

The most convenient chemical for meeting the above-noted conditions is sodium peroxid, as before stated. This substance easily parts with one atom of oxygen, thus supplying the necessary element for burning the carbon and hydrogen of organic combustible material. Moreover, the products of combustion thus formed—viz., carbonic-acid gas ($CO_2$) and water ($H_2O$)—have a marked affinity for the compound resulting from the extraction of one atom of oxygen—viz., $Na_2O$—and with it they unite to form the compounds, sodium carbonate ($Na_2CO_3$) and sodium hydrate, ($Na_2OH_2$.) Some other compounds have the same property, as $K_2O_2$, &c., and some mixtures may be found which will accomplish the same results; but I find the compound above described best suited for the purpose. In the combination of $CO_2$ with $Na_2O$ other heat units are evolved, and $H_2O$ with $Na_2O$ evolves heat units, so that from the burning of C (carbon of coal, &c.) and H (hydrogen of coal, &c.) the real heat of combustion is produced. Then these products $CO_2$ and $H_2O$ in their very vigorous union with $Na_2O$ produce other heat units; but, unlike the varying indeterminate heat units hereinbefore mentioned, this extra heat is definite in its proportion to the amount of heat of combustion, so that a correction-factor has been determined which is constant—viz., twenty-three and two-thirds per cent. In other words, the total heat evolved by the particular chemical combustion desired to produce these conditions is one hundred and twenty-three and two-thirds per cent. of the actual heat produced by the burning of the combustible.

For the carrying out of my invention I employ a most simple and inexpensive apparatus and have devised a novel and peculiar means whereby the combustible is ignited and the combustion-chamber closed during the process of combustion, which consists of a hollow rod having an orifice and carrying a valve which acts against a valve-seat formed in the head of the chamber or cartridge, while the rod is worked through a stem of the said head and controlled by a spiral spring, so that when the valve is open a hot wire is passed through the rod, orifice, and valve opening into the chamber. The factor for this wire is three one-hundredths of a degree, varying with the length of the wire. The mixture has the property of igniting from a drop or so of water, especially if it has in solution a little organic matter, such as sugar or glycerin, or the wire may be heated to incandescence by an electric current applied for a short interval; but my said improved device gives the best results and is most accurate and reliable in operation.

Figure 2:
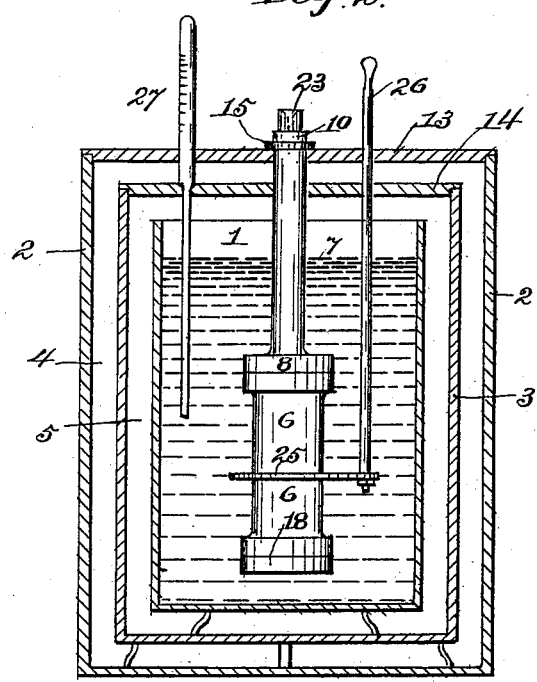
Figure 3:
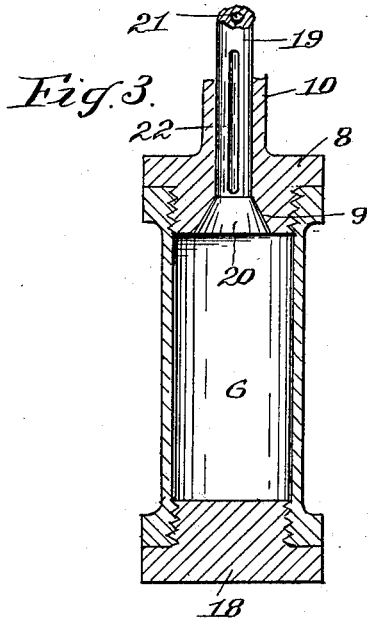
Figure 6:
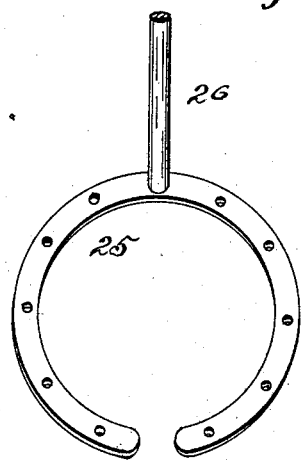

In the accompanying drawings, forming part of this application, Figure 1 is an elevation of a complete apparatus for carrying out my invention. Fig. 2 is a central vertical section of the inclosing vessels, showing the cartridge in elevation. Fig. 3 is a vertical section of the cartridge. Fig. 4 is a vertical section of the igniting device. Fig. 5 is a perspective view of the valve-rod. Fig. 6 is a perspective view of the stirrer. Fig. 7 is a vertical section of a modification. Fig. 8 is a perspective view of a modified form of stirrer. Fig. 9 is a further modification in section, showing a cup in the bottom of the cartridge.

The same numeral references denote the same parts throughout the several views of the drawings.

The preferred form of apparatus for carrying out my invention consists of a water vessel 1, insulated to prevent radiation of heat by inclosures or non-conducting vessels 2 and 3, having air-spaces 4 and 5, repectively, between them and the water vessel. A cartridge 6, forming a closed combustion-chamber, is submerged or immersed in the vessel below the water-line 7 and has a screw-head 8, provided with a valve-seat 9, in communication with a tubular stem 10, projecting from the top of the head 8 and through the covers 13 and 14, respectively, of the insulating vessels 2 and 3, where it is provided with a flange 15 for suspending the cartridge and covering the joint between the stem and covers. The projecting end of the tube has a chamber 16 and a shoulder 17 at the juncture of the chamber and the bore of the tube. The cartridge has a suitable screw-bottom 18 for removal and replacement as desired.

The device through which ignition is effected consists of a rod 19, having a conical solid lower end forming a valve 20 to fit the seat 9 and a central bore 21, terminating at the valve end of the rod in an orifice 22. The rod 19 works in the tube 10, and its upper end is provided with a mouthpiece 23, projecting from the tube-chamber 16. Surrounding the rod in the chamber 16 is a spiral spring 24, the ends of which abut against the inner end of the mouthpiece and the shoulder 17 to control the vertical movement of the rod and to close the valve thereof against the seat 9, the valve being opened by pressure on the mouthpiece or top of the rod.

To agitate the water and distribute the heat from the cartridge, I arrange a stirrer 25 around the cartridge and provide it with an arm 26, reaching to the outside of the apparatus, by means of which the stirrer is operated to insure uniform temperature of the water, the temperature being taken by a thermometer 27.

The operation is as follows: An amount— from fifteen to twenty grams—of the chemical is placed within the cartridge with a carefully-weighed amount (about one gram) of the combustible, the two ends of the cartridge screwed up tightly, and the whole shaken to thoroughly mix the materials. The cartridge is then immersed in a carefully-measured quantity of water, (preferably two liters or the equivalent thereof.) After uniform temperature throughout the system is reached the temperature is read. Then the rod 19 is pressed down, which separates the valve 20 from its seat 9 and opens communication between the cartridge-chamber and the bore of the rod through the orifice 22. A small red-hot copper wire or a little solution of sugar or glycerin is dropped through the mouthpiece into the bore of the rod, whence it descends through the orifice into the combustion-chamber with the mixed material. The pressure on the rod is released, and it is operated by the spiral spring to close the valve, leaving the cartridge air-tight. Ignition takes place and combustion commences. The interior air of the cartridge is thus heated by combustion, but is not permitted to escape, because of the closing of the valve before combustion commences, and all the products of combustion are therefore absorbed. All the heat generated is confined to the cartridge and is taken up in conduction by the water. By operating the stirrer uniform temperature throughout the water is secured, and after a suitable time—say from five to seven minutes—the reading of the thermometer is taken.

Referring to the modification shown in Figs. 7 and 8, the tubular stem has a pulley 28 and a handle 29, by which the cartridge may be turned by a driving-belt or by hand. The lower end of the cartridge is provided with a spring-ring 30, having vanes 31, constituting a stirrer. The ring is made to spring on and off the cartridge, so that they may be readily connected, and as the cartridge is turned on its bottom pivot 32 it carries the ring with it to insure a uniform temperature of the water.

In determining the heating capacity of coke and anthracite better results are attained by employing a cup, as shown in Fig. 9. The cup 33 has an enlarged or thickened rim 34, which forms the only contact between the inner cartridge-wall and the cup, and the latter has a slight bottom projection 35, engaged by the bottom of the cartridge to hold the cup-rim up against an offset 36 of the said wall. The fusion as it settles down into the cup sends off its heat through the said contact-surfaces and through the air-space 37, surrounding the cup. This retards the heat absorption a little—just enough to keep heat of the entire mass well up above the point of ignition—thus insuring a perfect combustion, but not sufficiently retarding to lessen the general advantage the instrument has of quick absorption of the heat units.

In operating the instrument or apparatus with the cup the loose chemical mixture before firing fills the cartridge half or two-thirds full; but it fuses down into a mass at the bottom one-half inch or less in depth inside the cup. There is great advantage derived in cleaning out and making ready for a new charge by employing several of these cups, as they are easily removed and replaced by operating the bottom of the cartridge to remove and replace them. In operating the apparatus with other than soft coals and without the cup the chemical charge rests upon the bottom of the cartridge and the cooling effect of the larger mass of metal is a little too rapid, so that there is a slight tendency to arrest the combustion at the outer surface next to the bottom and in the corners of the cartridge.

It will be observed that I use a chemical which is weighed or measured in the open air and mixed with the combustible at ordinary atmospheric pressure and that I absorb the heat evolved from a solid product and not from gaseous constituents. By this process a great advantage is gained in simplicity of apparatus, in rapidity of procedure, and in quick absorption of the heat, thus avoiding any errors from radiation and circulation.

Having thus described my invention, what I claim as new, and desire to secure by Letters Patent, is—

1. The combination, with the cartridge having a head provided with a valve-seat, of a spring-controlled hollow rod working through the said head, and a valve on the rod to fit the said seat.

2. In a calorimeter, the combination, with a combustion-chamber having a head provided with a valve-seat, of a spring-controlled valve-rod having a bore terminating in an orifice and working through the said head to open and close communication with the said chamber.

3. In a calorimeter, the combination, with a combustion-chamber having a head provided with a valve-seat, and a tubular stem projecting from the head, of a spring-controlled valve, and a valve-rod having a bore terminating in an orifice and working in the stem and through the said head to open and close communication with the said chamber.

4. In a calorimeter, the combination, with a combustion-chamber, of means for giving access for the purpose of igniting the same, comprising an inclosed rod having a valve working in the chamber, and provided with a bore terminating in an orifice, and a spiral spring to control the movement of the rod.

5. The combination, with the combustion-chamber having an interior valve-seat, a tubular stem projecting from the seat, and having a chamber therein, a mouthpiece projecting from the stem-chamber, and a spiral spring in the latter chamber, of a hollow rod secured to the mouthpiece and having an orifice, and a valve on the rod to engage the said seat.

6. A device giving access for the purpose of igniting inclosed combustibles, comprising a valved tube extending from the combustion-chamber, a hollow rod extending from the valve through the tube, and a spring in the tube for operating the rod to close the valve.

7. The combination, with the water vessel, and the cartridge or combustion-chamber immersed therein to heat the water, of a stirrer extending around the cartridge, and having an arm reaching outside the said vessel, and adapted to be operated to agitate the water and produce a uniform temperature therein.

In witness whereof I hereunto set my hand in the presence of two witnesses.

SAMUEL W. PARR.

Witnesses:
J. R. PRATT,
JASPER EGGLESTON.